United States Patent
Jono et al.

(10) Patent No.: US 7,906,579 B2
(45) Date of Patent: Mar. 15, 2011

(54) AQUEOUS MODIFIED POLYISOCYANATE, NON-YELLOWING COATING COMPOSITION, AND ADHESIVE COMPOSITION

(75) Inventors: Takaki Jono, Yokohama (JP); Naotaka Izumi, Yokohama (JP); Iku Ohki, Yokohama (JP); Mitsuru Chiba, Yokohama (JP)

(73) Assignee: Nippon Polyurethane Industry Co., Ltd., Tokyo (JP)

( * ) Notice: Subject to any disclaimer, the term of this patent is extended or adjusted under 35 U.S.C. 154(b) by 160 days.

(21) Appl. No.: 12/227,298

(22) PCT Filed: Apr. 17, 2007

(86) PCT No.: PCT/JP2007/058303
§ 371 (c)(1),
(2), (4) Date: Nov. 13, 2008

(87) PCT Pub. No.: WO2007/132617
PCT Pub. Date: Nov. 22, 2007

(65) Prior Publication Data
US 2009/0209711 A1    Aug. 20, 2009

(30) Foreign Application Priority Data
May 15, 2006 (JP) ................. 2006-135818

(51) Int. Cl.
C08G 18/08  (2006.01)
C08G 18/28  (2006.01)
C08J 3/00   (2006.01)
C08K 3/20   (2006.01)
C08L 75/00  (2006.01)

(52) U.S. Cl. ......... 524/589; 524/590; 524/591; 524/839; 524/840

(58) Field of Classification Search ................ 524/589, 524/590, 591, 839, 840
See application file for complete search history.

(56) References Cited

U.S. PATENT DOCUMENTS

| | | | | |
|---|---|---|---|---|
| 4,701,480 A | * | 10/1987 | Markusch et al. | 523/340 |
| 5,194,487 A | * | 3/1993 | Jacobs | 524/591 |
| 5,373,050 A | | 12/1994 | Morikawa et al. | |

FOREIGN PATENT DOCUMENTS

| | | |
|---|---|---|
| JP | 7-48429 A | 2/1995 |
| JP | 7-330861 A | 12/1995 |
| JP | 8-85716 A | 4/1996 |
| JP | 3089623 U | 8/2002 |
| JP | 2002-2345830 A | 12/2002 |
| JP | 2003-89713 A | 3/2003 |
| JP | 2003-119449 A | 4/2003 |
| JP | 2004-107496 A | 4/2004 |
| JP | 2005-264149 A | 9/2005 |
| JP | 2005-272592 A | 10/2005 |

OTHER PUBLICATIONS

Machine English translation of JP 2003-089713.*
English-language International Preliminary Report on Patentability and Written Opinion of the International Searching Authority, dated Dec. 24, 2008 for International Application PCT/JP2007/05803 filed Apr. 17, 2007; Applicants: Nippon Polyurethane Industry Co, Ltd.

* cited by examiner

*Primary Examiner* — Patrick D Niland
(74) *Attorney, Agent, or Firm* — Holtz, Holtz, Goodman & Chick PC

(57) ABSTRACT

A aqueous modified polyisocyanate intended to be dispersed in an aqueous medium for use and obtained by reacting an HDI derivative with (A) a modifying agent composed of a methoxy polyoxyalkylene glycol mainly comprising an ethylene oxide unit, (B) a modifying agent composed of a hydroxyl group-terminated polyoxyalkylene glycol produced by using an alcohol having 8 or more carbon atoms as an initiator and mainly comprising a propylene oxide unit, and (C) a modifying agent composed of an ester compound having at least one hydroxyl group with an alkali metal salt of sulfonic acid introduced therein, wherein the concentration (calculated value) of the alkali metal salt of sulfonic acid derived from the modifying agent (C) is 1.5 to 25 μmol/g. The aqueous modified polyisocyanate is not only excellent in dispersion stability in water but also excellent in stability of the isocyanate group in water even under temperature conditions of 35 ° C. or higher.

17 Claims, No Drawings

AQUEOUS MODIFIED POLYISOCYANATE, NON-YELLOWING COATING COMPOSITION, AND ADHESIVE COMPOSITION

This application is a United States national phase application of International Application PCT/JP2007/058303 filed Apr. 17, 2007.

TECHNICAL FIELD

The present invention relates to an aqueous modified polyisocyanate obtained by modifying a derivative of HDI (hexamethylenediisocyanate), and a non-yellowing coating composition and an adhesive composition using this compound as a hardener.

BACKGROUND ART

An aqueous modified polyisocyanate of the self-emulsifiable type is obtained by reacting an isocyanate derivative such as an isocyanulate group-containing polyisocyanate with a nonionic modifying agent such as an alkoxy polyoxyalkylene glycol.

The aqueous modified polyisocyanate is required to be good in dispersion stability and stability of the isocyanate group in water.

An aqueous modified polyisocyanate poor in dispersion stability in water sediments after dispersed in water to fail to sufficiently develop the expected performance (coating film performance or adhesion performance), and turbidity caused by aggregates of this modified product arises in a coating film formed by a coating composed of an aqueous dispersion of the modified product, thereby markedly impairing the appearance thereof.

A modified polyisocyanate poor in stability of the isocyanate group in water cannot secure a sufficient pot life when it is used as a constituent component (hardener) of a coating or adhesive.

As aqueous modified polyisocyanates good in dispersion stability and stability of the isocyanate group in water, the present assignee has proposed:

a modified polyisocyanate of the self-emulsifiable type obtained by subjecting HDI to urethane modification with a dihydric alcohol having 4 to 35 carbon atoms, the total number of carbon atoms branched of which is 2 to 33, a hydrophilic surfactant (for example, methoxy polyoxyethylene glycol) having an active hydrogen group capable of reacting with an isocyanate group and 3 to 90 alkylene oxide units, an aliphatic compound (for example, methyl ricinoleate) having an active hydrogen group capable of reacting with the isocyanate group and 8 or more carbon atoms and a non-branched glycol having 1 to 10 carbon atoms, and to urethodionation and isocyanuration (see Patent Art. 1); and a modified polyisocyanate of the self-emulsifiable type obtained by reacting an isocyanate derivative such as an HDI derivative with a hydrophilic surfactant (for example, methoxy polyoxyethylene glycol) having at least one active hydrogen group capable of reacting with an isocyanate group and a fatty acid ester (for example, methyl ricinoleate), in which the total number of carbon atoms in a fatty acid and a hydroxyl group-containing compound that become raw materials is 8 or more, and which has at least one active hydrogen group capable of reacting with the isocyanate group, at specific proportions (see Patent Art. 2).

The present assignee has also proposed, as an isocyanate group-containing adhesive having a high fixing rate to inorganic fibers, a modified polyisocyanate obtained by reacting an organic polyisocyanate with an ionic hydrophilic group-containing active hydrogen compound and a nonionic hydrophilic group-containing active hydrogen compound (see Patent Art. 3).

Patent Art. 1: Japanese Patent No. 2959399;
Patent Art. 2: Japanese Patent No. 3089623;
Patent Art. 3: Japanese Patent Application Laid-Open No. 2003-119449.

DISCLOSURE OF THE INVENTION

Problems Sought for Solution by the Invention

In a coating or adhesive used in, for example, summer, an operation such as preparation, coating or drying is conducted under an environment of relatively high temperature (for example, 35° C. or higher).

However, the modified polyisocyanates described in Patent Art. 1 and Patent Art. 2 are good in dispersion stability in water under an environment of ordinary temperature of about 25° C. to some extent, but involve a problem that the dispersion stability in water is rapidly lowered under temperature conditions of 35° C. or higher.

On the other hand, the modified polyisocyanate described in Patent Art. 3 is poor in stability of the isocyanate group in water and so involves a problem that a sufficient pot life cannot be secured as a coating or adhesive. In addition, the pot life of the coating or adhesive becomes short as a temperature upon use becomes high.

The present invention has been made on the basis of the foregoing circumstances.

It is a first object of the present invention to provide an aqueous modified polyisocyanate not only excellent in dispersion stability in water but also excellent in stability of the isocyanate group in water even under temperature conditions of 35° C. or higher.

A second object of the present invention is to provide a non-yellowing coating composition, which is excellent in dispersion stability of a hardener in an aqueous medium, can secure a sufficient pot life and can form a coating film that is free of turbidity and excellent in glossiness, can sufficiently develop expected coating film performance and is also excellent in water resistance even when the composition is used under a temperature environment of 35° C. or higher.

A third object of the present invention is to provide an adhesive composition, which is excellent in dispersion stability of a hardener in an aqueous medium, can secure a sufficient pot life and can form an adhesive layer that can sufficiently develop expected adhesion performance and water-resistant adhesion performance even when the composition is used under a temperature environment of 35° C. or higher.

Means for the Solution of the Problems

An aqueous modified polyisocyanate according to the present invention is intended to be dispersed in an aqueous medium for use and is obtained by reacting an HDI derivative with (A) a modifying agent composed of a methoxy polyoxyalkylene glycol mainly comprising an ethylene oxide unit, (B) a modifying agent composed of a hydroxyl group-terminated polyoxyalkylene glycol produced by using an alcohol having 8 or more carbon atoms as an initiator and mainly comprising a propylene oxide unit, and (C) a modifying agent composed of an ester compound having at least one hydroxyl group with an alkali metal-salt of sulfonic acid introduced therein, wherein the concentration (calculated value) of the alkali metal salt of sulfonic acid derived from the modifying agent (C) is 1.5 to 25 µmol/g.

In the aqueous modified polyisocyanate according to the present invention, the following modes may be preferred.
(1) The HDI derivative is an isocyanurate group-containing polyisocyanate.
(2) In the isocyanurate group-containing polyisocyanate that is the HDI derivative, the proportion of a trimer as determined by differential refractive index detection of GPC is 60% by area or higher, and the average number of functional groups as determined on the basis of GPC analysis is 2.4 to 5.0.
(3) The HDI derivative is an allophanate group-containing polyisocyanate.
(4) The viscosity (at 25° C.) of the HDI derivative is 2,500 mPa·s or lower, particularly 2,000 mPa·s or lower.
(5) The modifying agent (A) is methoxy polyoxyethylene glycol.
(6) The modifying agent (B) is polyoxypropylene mono-2-ethylhexyl ether.
(7) The modifying agent (C) is a polyester polyol containing sodium sulfonate.
(8) The aqueous modified polyisocyanate is obtained by reacting 67 to 92.5% by mass of the HDI derivative with 5.0 to 20% by mass of the modifying agent (A), 2.0 to 10% by mass of the modifying agent (B) and 0.5 to 7.0% by mass of the modifying agent (C) (however, the total % by mass being 100).
(9) The concentration of the alkali metal salt of sulfonic acid derived from the modifying agent (C) is 2.0 to 20 µmol/g.
(10) The aqueous modified polyisocyanate is obtained by reacting the HDI derivative composed of the isocyanurate group-containing polyisocyanate and/or the allophanate group-containing polyisocyanate with the modifying agent (A) composed of methoxy polyoxyethylene glycol, the modifying agent (B) composed of polyoxypropylene mono-2-ethylhexyl ether and the modifying agent (C) composed of the polyester polyol containing sodium sulfonate.

An aqueous polyisocyanate composition according to the present invention comprises the aqueous modified polyisocyanate according to the present invention and an anionic surfactant.

A non-yellowing coating composition according to the present invention comprises a main material containing a water-soluble or water-dispersible polymer and a hardener composed of the aqueous modified polyisocyanate according to the present invention.

An adhesive composition according to the present invention comprises a main material containing a water-soluble or water-dispersible polymer and a hardener composed of the aqueous modified polyisocyanate according to the present invention.

EFFECTS OF THE INVENTION (1) The aqueous modified polyisocyanate according to the present invention is not only excellent in dispersion stability in water but also excellent in stability of the isocyanate group in water even under temperature conditions of 35° C. or higher. In other words, a nonionic hydrophilic group is introduced into a modified product obtained by reacting the HDI derivative with the modifying agent (A), thereby improving the dispersion stability in water at ordinary temperature (for example, 25° C.). An anionic hydrophilic group (the alkali metal salt of sulfonic acid) is introduced into a modified product obtained by a reaction with the modifying agent (C), thereby not only more improving the dispersion stability at ordinary temperature but also improving dispersion stability in water under temperature conditions of 35° C. or higher. A lipophilic group having a moderate chain length is introduced into a modified product obtained by a reaction with the modifying agent (B), thereby improving the stability in water of the isocyanate group that the modified product has. In addition, the concentration of the alkali metal salt of sulfonic acid derived from the modifying agent (C) falls within the specific range, whereby excellent dispersion stability is imparted to the resulting modified product, and a film to be formed also has good water resistance.

(2) The non-yellowing coating composition according to the present invention is excellent in dispersion stability of a hardener in an aqueous medium even under temperature conditions of 35° C. or higher. Accordingly, the non-yellowing coating composition according to the present invention can form a coating film that is free of turbidity and excellent in glossiness and can sufficiently develop expected coating film performance even when the composition is used under such temperature conditions. In addition, the coating film is also excellent in water resistance. Further, since the isocyanate group making up the hardener in the non-yellowing coating composition according to the present invention is stable in the aqueous medium, the composition has a sufficient pot life.

(3) The adhesive composition according to the present invention is excellent in dispersion stability of a hardener in an aqueous medium even under temperature conditions of 35° C. or higher. Accordingly, the adhesive composition according to the present invention can form an adhesive layer that can sufficiently develop expected adhesion performance and is also excellent in water resistance (water-resistant adhesion performance) even when the composition is used under such temperature conditions. Further, since the isocyanate group making up the hardener in the adhesive composition according to the present invention is stable in the aqueous medium, the composition has a sufficient pot life.

BEST MODE FOR CARRYING OUT THE INVENTION

The present invention will hereinafter be described in details.

The aqueous modified polyisocyanate according to the present invention is a modified polyisocyanate dispersed in an aqueous medium for use and obtained by reacting an HDI derivative with a modifying agent (A), a modifying agent (B) and a modifying agent (C).

<HDI Derivative>

As the HDI derivative to be modified, may be mentioned a polyisocyanate obtained by using HDI (hexamethylenediisocyanate) as a raw material and comprising, as a main component, at least one component selected from the group consisting of isocyanurate group-containing polyisocyanates, urethodione group-containing polyisocyanates, urethodione group- and isocyanurate group-containing polyisocyanates, urethane group-containing polyisocyanates, allophanate group-containing polyisocyanates, biuret group-containing polyisocyanates, carbodiimido group-containing polyisocyanates and urethoneimine group-containing polyisocyanates. Among these, isocyanurate group-containing polyisocyanates and allophanate group-containing polyisocyanates are preferred.

The NCO content in the HDI derivative is preferably 15 to 25% by mass, more preferably 16 to 24% by mass.

If the NCO content in the HDI derivative is too low, a coating film or adhesive layer formed by a coating or adhesive comprising the resulting modified polyisocyanate as a hardener fails to sufficiently develop performance such as water resistance, solvent resistance, heat resistance and adhesion to a base material. If the NCO content in the HDI derivative is too high on the other hand, a reaction of a hardener composed of the resulting modified polyisocyanate with a main material or water becomes too fast, so that a sufficient pot life is not achieved, or processability is impaired.

The number average molecular weight of the HDI derivative is preferably 400 to 1,400, more preferably 500 to 1,000.

If the number average molecular weight of the HDI derivative is too low, a coating film or adhesive layer formed by a coating or adhesive comprising the resulting modified polyisocyanate as a hardener fails to sufficiently develop performance such as water resistance, solvent resistance, heat resistance and adhesion to a base material. If the number average molecular weight of the HDI derivative is too high on the other hand, the viscosity of the resulting modified polyisocyanate becomes too high, and so its initial dispersibility in water is deteriorated, thereby failing to form a good coating film or adhesive layer.

The term "number average molecular weight" as used herein means a value measured in terms of polystyrene using a refractive index detector by GPC.

The viscosity (at 25° C.) of the HDI derivative is preferably 2,500 mPa·s or lower, more preferably 2,000 mPa·s or lower, particularly preferably 1,500 mPa·s or lower. The viscosity (at 25° C.) of the HDI derivative is controlled to 2,500 mPa·s or lower, whereby the viscosity (at 25° C.) of the aqueous modified polyisocyanate according to the present invention, which is obtained by modifying this derivative, can be controlled within a preferable range, which will be described subsequently.

In an isocyanurate group-containing polyisocyanate, which is a preferable HDI derivative, the average number of functional groups as determined on the basis of GPC analysis (the number average molecular weight in terms of polystyrene as measured by GPC and NCO content) is preferably 2.4 to 5.0, more preferably 2.5 to 4.9. If the average number of functional groups in the isocyanurate group-containing polyisocyanate (HDI derivative) is too small, a coating film or adhesive layer formed by a coating or adhesive comprising the resulting modified polyisocyanate as a hardener fails to sufficiently develop performance such as water resistance, solvent resistance, heat resistance and adhesion to a base material. If the average number of functional groups in the isocyanurate group-containing polyisocyanate is too great on the other hand, the viscosity of the resulting modified polyisocyanate becomes too high, and so its initial dispersibility in water is deteriorated, thereby failing to form a good coating film or adhesive layer. In addition, a reaction of a hardener composed of the resulting modified polyisocyanate with a main material or water becomes too fast, so that a sufficient pot life is not achieved, or processability is impaired.

In the isocyanurate group-containing polyisocyanate, which is a preferable HDI derivative, the proportion of a trimer as determined by differential refractive index detection of GPC is preferably 60% by area or higher, more preferably 65% by area or higher. The proportion of the trimer is 60% by area or higher, thereby permitting the isocyanurate group-containing polyisocyanate (HDI derivative) to have a low viscosity, and in turn permitting an aqueous modified polyisocyanate obtained from this compound to have a low viscosity and to improve uniform dispersibility in an aqueous medium.

The amount of the HDI derivative used for obtaining the aqueous modified polyisocyanate according to the present invention is preferably 67 to 92.5% by mass, more preferably 70 to 90% by mass based on the resulting aqueous modified polyisocyanate.

If the amount of the HDI derivative used is too large (the amount of the modifying agents is too small), the resulting modified polyisocyanate becomes poor in dispersibility in water, and a coating film or adhesive layer to be formed fails to sufficiently develop the expected performance (coating film performance, adhesion performance). If the amount of the HDI derivative used is too small (the amount of the modifying agents is too large) on the other hand, a coating film or adhesive layer to be formed is softened and does not have sufficient strength.

<Modifying Agent (A)>

The modifying agent (A) used for obtaining the aqueous modified polyisocyanate according to the present invention is composed of a methoxy polyoxyalkylene glycol mainly comprising an ethylene oxide unit.

A nonionic hydrophilic group is introduced into a modified product obtained by a reaction of the HDI derivative with the modifying agent (A), thereby improving the dispersion stability in water at ordinary temperature (for example, 25° C.).

The term "mainly comprising an ethylene oxide unit" as used herein means that 70 mol % or higher of alkylene oxide units that the modifying agent (A) has are an ethylene oxide (EO) unit. The proportion of the EO unit is preferably 80 mol % or higher, more preferably 90 mol % or higher, particularly preferably 100 mol %.

The number average molecular weight of the modifying agent (A) is preferably 350 to 1,000, more preferably 400 to 800.

The hydroxyl value of the modifying agent (A) is preferably 56 to 160 mg KOH/g, more preferably 70 to 140 mg KOH/g.

As a preferable modifying agent (A), may be mentioned methoxy polyoxyethylene glycol.

The amount of the modifying agent (A) used is preferably 5.0 to 20% by mass, more preferably 7.0 to 18% by mass based on the resulting aqueous modified polyisocyanate.

If the amount of the modifying agent (A) used is too small, the resulting modified polyisocyanate becomes poor in dispersion stability in water and may sediment in some cases after dispersed in water. If the amount of the modifying agent (A) used is too large on the other hand, the resulting modified polyisocyanate becomes poor in stability of the isocyanate group in water, and so an aqueous dispersion (for example, a non-yellowing coating composition or adhesive composition comprising the modified polyisocyanate as a hardener) obtained from such a modified product fails to secure a sufficient pot life.

<Modifying Agent (B)>

The modifying agent (B) used for obtaining the aqueous modified polyisocyanate according to the present invention is composed of a hydroxyl group-terminated polyoxyalkylene glycol produced by using an alcohol having 8 or more carbon atoms as an initiator and mainly comprising a propylene oxide unit.

A lipophilic group having a moderate chain length of 8 or more carbon atoms is introduced into a modified product obtained by a reaction of the HDI derivative with the modifying agent (B). In an aqueous dispersion of this modified product, a reaction of the isocyanate group that the modified product has with a water molecule is thereby inhibited by the lipophilic group introduced. As a result, the stability of the isocyanate group in water is improved.

The term "mainly comprising a propylene oxide unit" as used herein means that 70 mol % or higher of alkylene oxide units that the modifying agent (B) has are a propylene oxide (PO) unit. The proportion of the PO unit is preferably 80 mol % or higher, more preferably 90 mol % or higher, particularly preferably 100 mol %.

As examples of "the alcohol having 8 or more carbon atoms" used for obtaining the modifying agent (B), may be mentioned 2-ethylhexyl alcohol, octyl alcohol, capryl alcohol, nonyl alcohol, decyl alcohol, undecyl alcohol, lauryl alcohol, tridecyl alcohol, myristyl alcohol, pentadecyl alcohol, cetyl alcohol and cinnamyl alcohol.

The number average molecular weight of the modifying agent (B) is preferably 350 to 1,000, more preferably 400 to 900.

The hydroxyl value of the modifying agent (B) is preferably 56 to 160 mg KOH/g, more preferably 70 to 140 mg KOH/g.

As a preferable modifying agent (B), may be mentioned polyoxypropylene mono-2-ethylhexyl ether.

The amount of the modifying agent (B) used is preferably 2.0 to 10% by mass, more preferably 3.0 to 9.0% by mass based on the resulting aqueous modified polyisocyanate.

If the amount of the modifying agent (B) used is too small, the resulting modified polyisocyanate becomes poor in stability of the isocyanate group in water, and so an aqueous dispersion (for example, a non-yellowing coating composition or adhesive composition comprising the modified polyisocyanate as a hardener) obtained from such a modified product fails to secure a sufficient pot life. If the amount of the modifying agent (B) used is too large on the other hand, the resulting modified polyisocyanate becomes poor in dispersion stability in water and may sediment in some cases after dispersed in water.

<Modifying Agent (C)>

The modifying agent (C) used for obtaining the aqueous modified polyisocyanate according to the present invention is composed of an ester compound having at least one hydroxyl group (active hydrogen group capable of reacting with an isocyanate group) with an alkali metal salt of sulfonic acid introduced therein.

An anionic hydrophilic group (the alkali metal salt of sulfonic acid) is introduced into a modified product obtained by a reaction of the HDI derivative with the modifying agent (C), thereby not only more improving the dispersion stability in water at ordinary temperature but also improving dispersion stability in water under temperature conditions of 35° C. or higher.

As examples of "the alkali metal salt of sulfonic acid", may be mentioned sodium sulfonate and potassium sulfonate.

The number average molecular weight of the modifying agent (C) is preferably 400 to 2,000, more preferably 500 to 1,500.

The hydroxyl value of the modifying agent (C) is preferably 28 to 280 mg KOH/g, more preferably 37 to 225 mg KOH/g.

The content of the alkali metal salt of sulfonic acid in the modifying agent (C) is preferably 0.2 to 1.5 mmol/g, more preferably 0.3 to 1.0 mmol/g.

As a preferable modifying agent (C), may be mentioned a polyester polyol containing sodium sulfonate.

The polyester polyol containing sodium sulfonate is suitably formed by a reaction of a polyester polyol containing a sulfonic acid group with sodium hydroxide (basic neutralizing agent). It may also be suitably formed by a reaction (transesterification reaction) of a polyester polyol with a polybasic acid containing sodium sulfonate.

The amount of the modifying agent (C) used varies according to the content of the alkali metal salt of sulfonic acid in the modifying agent (C) but is preferably 0.5 to 7.0% by mass, more preferably 0.7 to 5.0% by mass based on the resulting aqueous modified polyisocyanate.

If the amount of the modifying agent (C) used is too small, the concentration of the alkali metal salt of sulfonic acid contained in the resulting modified polyisocyanate cannot be controlled to 1.5 µmol/g or higher (see Comparative Example 7, which will be described subsequently). If the amount of the modifying agent (C) used is too large on the other hand, the concentration of the alkali metal salt of sulfonic acid contained in the resulting modified polyisocyanate cannot be controlled to 25 µmol/g or lower (see Comparative Example 6, which will be described subsequently).

<Aqueous Modified Polyisocyanate>

The aqueous modified polyisocyanate according to the present invention can be produced by reacting the HDI derivative with the modifying agent (A), the modifying agent (B) and the modifying agent (C) successively or simultaneously.

In this case, the proportion [equivalent ratio of the isocyanate group that the HDI derivative has to the hydroxyl groups that the modifying agents (A) to (C) have] of the HID derivative to the modifying agents (A) to (C) used is determined by calculating out conditions, under which no gelling occurs upon the reaction, according to factors such as the intended number average molecular weight, the average number of functional groups in the HDI derivative and the average numbers of functional groups in the modifying agents (A) to (C) so as to satisfy the conditions.

A preferable proportion used is such that the HDI derivative is 67 to 92.5% by mass, the modifying agent (A) is 5.0 to 20% by mass, the modifying agent (B) is 2.0 to 10% by mass, and the modifying agent (C) is 0.5 to 7.0% by mass (however, the total % by mass being 100).

The reaction of the HDI derivative with the modifying agents (A) to (C) may be conducted in a molten state or bulk state, and in the presence of a solvent (for example, at least one of aromatic hydrocarbon solvents, ester solvents, ketone solvents, glycol ether ester solvents, ether solvents, alcohol solvents and polar solvents) as needed.

Upon the reaction, a catalyst (for example, an organometallic compound such as dibutyltin dilaurate or dioctyltin dilaurate, or an organic amine such as triethylenediamine or triethylamine or a salt thereof) may be used as needed.

In the aqueous modified polyisocyanate according to the present invention, the concentration (calculated value) of the alkali metal salt of sulfonic acid derived from the modifying agent (C) is 1.5 to 25 µmol/g, preferably 2.0 to 20 µmol/g.

The concentration of the alkali metal salt of sulfonic acid falls within the range of 1.5 to 25 µmol/g, whereby the resulting modified product becomes excellent in dispersion stability in water and can form a film (coating film or adhesive layer) having good water resistance.

An aqueous modified polyisocyanate, in which the concentration of the alkali metal salt of sulfonic acid is less than 1.5 µmol/g, is poor in dispersion stability in water under temperature conditions of 35° C. or higher and sediments after dispersed in water to fail to sufficiently develop the expected performance (coating film performance or adhesion performance), and turbidity caused by aggregates of this modified product arises in a coating film formed by a coating composed of an aqueous dispersion of the modified product, thereby markedly impairing the appearance thereof (see Comparative Example 7, which will be described subsequently). If the concentration of the alkali metal salt of sulfonic acid exceeds 25 µmol/g on the other hand, an aqueous dispersion obtained from such a modified product fails to form a film having good water resistance (see Comparative Example 6, which will be described subsequently).

The NCO content in the aqueous modified polyisocyanate according to the present invention is preferably 10 to 20% by mass, more preferably 13 to 18% by mass.

If the NCO content is too low, a coating film or adhesive layer formed by such a modified product is softened and cannot have sufficient strength. If the NCO content is too high on the other hand, the resulting modified polyisocyanate becomes poor in dispersibility in water, and a coating film or adhesive layer to be formed therefrom fails to sufficiently develop the expected performance (coating film performance or adhesion performance).

The number average molecular weight of the aqueous modified polyisocyanate according to the present invention is preferably 390 to 1,400, more preferably 400 to 1,200.

If the number average molecular weight is too low, a coating film or adhesive layer formed by a coating or adhesive comprising such a modified polyisocyanate as a hardener fails to sufficiently develop performance such as water resistance, solvent resistance, heat resistance and adhesion to a base material. If the number average molecular weight is too high on the other hand, the viscosity of such a modified polyisocyanate becomes too high, and its initial dispersibility in water is deteriorated, thereby failing to form a good coating film or adhesive layer.

The term "number average molecular weight" as used herein means a value measured in terms of polystyrene using a refractive index detector by GPC.

The viscosity (at 25° C.) of the aqueous modified polyisocyanate according to the present invention is preferably 5,000 mPa·s or lower, more preferably 3,000 mPa·s or lower, particularly preferably 2,000 mPa·s or lower.

In particular, when the aqueous modified polyisocyanate has a viscosity (at 25° C.) of 2,000 mPa·s or lower, its uniform dispersibility in an aqueous medium becomes excellent.

In the aqueous modified polyisocyanate according to the present invention, the average number of functional groups as determined on the basis of GPC analysis is preferably 2.0 to 4.9, more preferably 2.1 to 4.8.

If the average number of functional groups is too small, a coating film or adhesive layer formed by a coating or adhesive comprising such a modified polyisocyanate as a hardener fails to sufficiently develop performance such as water resistance, solvent resistance, heat resistance and adhesion to a base material. If the average number of functional groups is too great on the other hand, a reaction of a hardener composed of such a modified polyisocyanate with a main material or water becomes too fast, so that a sufficient pot life is not achieved, or processability is impaired. In addition, the viscosity of the modified polyisocyanate becomes too high, and so its initial dispersibility in water is deteriorated, thereby failing to form a good coating film or adhesive layer.

<Aqueous Polyisocyanate Composition>

The aqueous polyisocyanate composition according to the present invention comprises the aqueous modified polyisocyanate according to the present invention and an anionic surfactant.

No particular limitation is imposed on the anionic surfactant, and a conventionally known surfactant (for example, sulfonic acid type or sulfuric acid ester type) may be used.

As preferable examples of commercially available anionic surfactants, may be mentioned "Newcol 707SF", "Newcol 1305SN", "Newcol 291PG", "Newcol 740SF" and "Newcol 1703SFD" (all, products of Nippon Nyukazai Co., Ltd.).

According to the aqueous polyisocyanate composition of the present invention, the stability in water of the isocyanate group that the modified polyisocyanate has can be further improved. Accordingly, the aqueous polyisocyanate composition according to the present invention can be used as a hardener for a non-yellowing coating composition or adhesive composition, thereby further elongating its pot life (see Example 6, which will be described subsequently).

<Non-yellowing Coating Composition>

The non-yellowing coating composition according to the present invention comprises a main material containing a water-soluble or water-dispersible polymer and a hardener composed of the aqueous modified polyisocyanate according to the present invention.

As examples of the water-soluble polymer making up the main material, may be mentioned water-soluble polyols such as polyvinyl alcohol, water-soluble ethylene-vinyl acetate copolymers, polyethylene oxide, water-soluble acrylic resins, water-soluble epoxy resins, water-soluble cellulose derivatives, water-soluble polyester resins, water-soluble lignin derivatives, aqueous acrylpolyols and water-soluble polyester polyols. The main material (aqueous solution type) of the non-yellowing coating composition can be prepared by dissolving such a water-soluble polymer in an aqueous medium.

As examples of the water-dispersible polymer making up the main material, may be mentioned polyvinyl chloride resins, urethane acrylic resins, silicone acrylic resins, vinyl acetate acrylic resins, urethane resins, acrylic resins; rubbers such as styrene-butadiene copolymers, acrylonitrile-butadiene copolymers, methyl methacrylate-butadiene copolymers, chloroprene and polybutadiene; polyacrylic acid esters, polyvinylidene chloride, polybutadiene, and carboxyl-modified products thereof. The main material (aqueous emulsion type) of the non-yellowing coating composition can be prepared by dispersing such a water-dispersible polymer in an aqueous medium.

The non-yellowing coating composition according to the present invention is excellent in dispersion stability of the hardener in an aqueous medium even under temperature conditions of 35° C. or higher. Accordingly, the non-yellowing coating composition according to the present invention can form a coating film that is free of turbidity caused by aggregates of the hardener and excellent in glossiness and can sufficiently develop expected coating film performance (for example, heat resistance and solvent resistance) even when the composition is used under the temperature conditions of 35° C. or higher. The coating film formed by the non-yellowing coating composition according to the present invention is also excellent in water resistance. Further, the non-yellowing coating composition according to the present invention has a sufficient pot life because the isocyanate group making up the hardener is stable in the aqueous medium.

<Adhesive Composition>

The adhesive composition according to the present invention comprises a main material containing a water-soluble or water-dispersible polymer and a hardener composed of the aqueous modified polyisocyanate according to the present invention.

As examples of the water-soluble polymer making up the main material of the adhesive composition, may be mentioned those exemplified as that making up the main material (aqueous solution type) of the non-yellowing coating composition.

As examples of the water-dispersible polymer making up the main material of the adhesive composition, may be mentioned those exemplified as that making up the main material (aqueous emulsion type) of the non-yellowing coating composition.

The adhesive composition according to the present invention is excellent in dispersion stability of the hardener in an aqueous medium even under temperature conditions of 35° C. or higher. Accordingly, the adhesive composition according to the present invention can form an adhesive layer that can sufficiently develop expected adhesion performance and is also excellent in water resistance and water-resistant adhesion performance even when the composition is used under the temperature conditions of 35° C. or higher. Further, the adhesive composition according to the present invention has a sufficient pot life because the isocyanate group making up the hardener is stable in the aqueous medium.

EXAMPLES

The present invention will hereinafter be described by Examples. However, the present invention is not limited these examples. Incidentally, all designations of "part" or "parts" and "%" as will be used in the following examples mean "part or parts by mass" and "% by mass". HDI derivatives, modifying agents and anionic surfactants used in the following Examples and Comparative Examples are as follows.
(1) Polyisocyanate 1 (Isocyanurate Derivative of HDI):
  NCO content=21.3%
  Viscosity (at 25° C.)=2,500 mPa·s
  Number average molecular weight (as measured in terms of polystyrene by GPC)=700
  Average number of functional groups (based on GPC analysis)=3.5
  Proportion of trimer (by differential refractive index detection of GPC)=40% by area.
(2) Polyisocyanate 2 (Isocyanurate Derivative of HDI):
  NCO content=23.2%
  Viscosity (at 25° C.)=1,200 mPa·s
  Number average molecular weight (as measured in terms of polystyrene by GPC)=580
  Average number of functional groups (based on GPC analysis)=3.2
  Proportion of trimer (by differential refractive index detection of GPC)=67% by area.
(3) Polyisocyanate 3 (Allophanate Derivative of HDI):
  NCO content=19.2%
  Viscosity (at 25° C.)=1,900 mPa·s.
(4) Modifying Agent A (Methoxy Polyoxyethylene Glycol):
  Number average molecular weight=400
  Hydroxyl value=140 mg KOH/g.
(5) Modifying Agent B (Polyoxypropylene Mono-2-Ethylhexyl Ether):
  Number average molecular weight=806
  Hydroxyl value=70 mg KOH/g.
(6) Modifying Agent C (Hexane Adipate Type Polyester Polyol Containing Sodium Sulfonate):
  Number average molecular weight=1,000
  Average number of functional groups=2
  Hydroxyl value=107 mg KOH/g
  Content of sodium sulfonate=0.4 mmol/g.
(7) Modifying agent D (Methyl Ricinoleate):
  Comparative modifying agent
  Molecular weight=362
  Hydroxyl value=155 mg KOH/g.
(8) Anionic Surfactant
  "Newcol 291PG" (product of Nippon Nyukazai Co., Ltd.).

Example 1

A reactor equipped with a stirrer, a thermometer, a nitrogen sealing tube and a condenser was charged with 81 parts of Polyisocyanate 2 in accordance with the formulation shown in the following Table 1, and 13 parts of Modifying agent A, 5 parts of Modifying agent B and 1 part of Modifying agent C were added to conduct a reaction for 3 hours at 80° C., thereby obtaining a modified product (modified polyisocyanate according to the present invention) having self-emulsifiability.

The resultant modified product was such that the concentration (calculated value) of sodium sulfonate is 0.41 mg/g (4.0 μmol/g), the NCO content is 17.1%, the viscosity (at 25° C.) is 1,300 mPa·s, the number average molecular weight is 712, and the average number of functional groups is 2.9.

Examples 2 to 5

Modified products (modified polyisocyanates according to the present invention) having self-emulsifiability were obtained in the same manner as in Example 1 except that the kind and/or amount used of the polyisocyanate, and/or the amounts used of Modifying agent A, Modifying agent B and/or Modifying agent C were changed in accordance with their corresponding formulations shown in the following Table 1.

With respect to the respective modified products thus obtained, the concentrations (calculated value) of sodium sulfonate, NCO contents, viscosities (at 25° C.), number average molecular weights and average numbers of functional groups are shown collectively in Table 1.

Example 6

A composition (aqueous polyisocyanate composition according to the present invention) containing a modified product and an anionic surfactant was obtained in the same manner as in Example 3 except that the anionic surfactant was added in accordance with the formulation shown in the following Table 1.

Comparative Examples 1 to 7

Comparative modified polyisocyanates were obtained in the same manner as in Example 1 except that the kind and/or amount used of the polyisocyanate, and/or the kind(s) and/or amount(s) used of the modifying agent(s) were changed in accordance with their corresponding formulations shown in the following Table 1.

Comparative Example 1 is an example where Modifying agent B and Modifying agent C were not used, Comparative Example 2 is an example where Modifying agent C was not used, but Modifying agent D (methyl ricinoleate) was used, Comparative Example 3 is an example where Modifying agent C was not used, Comparative Example 4 is an example where Modifying agent B and Modifying agent C were not used, but Modifying agent D (methyl ricinoleate) was used, Comparative Example 5 is an example where Modifying agent B was not used, Comparative Example 6 is an example where the concentration (calculated value) of sodium sulfonate exceeds 25 μmol/g, and Comparative Example 7 is an example where the concentration (calculated value) of sodium sulfonate is less than 1.5 µmol/g. With respect to the respective modified products thus obtained, the concentrations (calculated value) of sodium sulfonate, NCO contents, viscosities (at 25° C.), number average molecular weights and average numbers of functional groups are shown collectively in Table 1.

<Evaluation of Modified Polyisocyanate>

The modified polyisocyanates of the present invention obtained in Examples 1 to 5, the polyisocyanate composition obtained in. Example 6, and modified polyisocyanates obtained in Comparative Examples 1 to 7 were respectively subjected to the following tests to evaluate them as to performance.

(1) Dispersion Test in Water (at 25° C.)

Ten grams of a modified polyisocyanate (composition) and 50 g of water were stirred and mixed for 30 minutes at 1,000 rpm while keeping a liquid temperature at 25° C., and the resultant aqueous dispersion of the modified polyisocyanate was contained in a 100-mL sample bottle and left at rest for 1 hour at 25° C. The condition of the aqueous dispersion was then visually observed to evaluate the dispersion stability in water of the modified polyisocyanate in accordance with the following standard (ii). A time [foaming time, unit (Hr)] to a reaction of the isocyanate group with water to foaming was measured, thereby evaluating the stability in water of the isocyanate group.

(2) Dispersion Test in Water (at 40° C.)

Ten grams of a modified polyisocyanate (composition) and 50 g of water were stirred and mixed for 30 minutes at 1,000 rpm while keeping a liquid temperature at 40° C., and the resultant aqueous dispersion of the modified polyisocyanate was contained in a 100-mL sample bottle to visually observe the condition of the aqueous dispersion just after contained in the bottle, thereby evaluate initial dispersibility (uniform dispersibility) in accordance with the following standard (i). After left at rest for 1 hour at 40° C., the condition of the aqueous dispersion was then visually observed again to evaluate the dispersion stability in water of the modified polyisocyanate in accordance with the following standard (ii). A foaming time [unit (Hr)] was measured, thereby evaluating the stability in water of the isocyanate group.

(i) Evaluation Standard of Initial Dispersibility:
"A": The aqueous dispersion is translucent, and the modified polyisocyanate (solids) is uniformly dispersed;
"B": The aqueous dispersion is turbid (white turbidity); and
"C": Sediment or suspended matter by the modified polyisocyanate is observed.

(ii) Evaluation Standard of Dispersion Stability:
"A": Sediment (sedimentation with time) by the modified polyisocyanate is not observed;
"B": Sediment is slightly observed; and
"C": Layer (phase) separation by sediment is clearly observed.

(3) Evaluation Test of Coating Film:

Two grams of a modified polyisocyanate (composition) and 20 g of a main material (I) for evaluation shown below were stirred and mixed for 30 minutes at 2,000 rpm while keeping a liquid temperature at 20° C., thereby preparing a coating composition. The resultant coating composition was applied on to the surface of a base material composed of a tin plate by an applicator having a thickness of 100 µm to form a coating film. This coating film was dried for 2 hours at 20° C., thereby preparing a specimen. This specimen is hereinafter referred to as "Specimen (I-20)".

On the other hand, a specimen with a dry coating film formed on the surface of a base material composed of a tin plate was prepared in the same manner as described above except that the temperature upon the preparation of the coating composition and the drying temperature of the coating film were changed to 40° C. This specimen is hereinafter referred to as "Specimen (I-40)".

Main Material (I) for Evaluation:
A blend resin composed of 50 parts of an aqueous acrylic resin "WA-1015ND" (product of Asia Industry Co., Ltd., solid content=50%, viscosity (at 25° C.)=300 mPa·s) and 50 parts of an aqueous urethane resin "WNS-356" (product of NIPPON POLYURETHANE INDUSTRY CO., LTD., solid content=30%, viscosity (at 25° C.)=30 mPa·s).

(3-1) Temperature Dependence of Transparency of Coating Film:

The respective ΔL values of Specimen (I-20) and Specimen (I-40) were measured by means of a color difference meter "CM-508d" (manufactured by MINOLTA Co.).

The ΔL values ($\Delta L_{20}$) of Specimens (I-20) were substantially the same (($\Delta L_{20}$ =−2.7 to −2.8) in all of Examples 1 to 6 and Comparative Examples 1 to 7.

The temperature dependence of the transparency of each coating film was evaluated by a numerical value determined by Equation $[(-\Delta L_{40} - \Delta L_{20})\Delta L_{40}] \times 100$. It may safely be said that the temperature dependence is small (good transparency is secured even in Specimen (I-40)) as this numerical value becomes small.

(3-2) Water Resistance of Coating Film:

After water was dropped on the coating film of Specimen (I-40) under temperature conditions of 25° C., a slide glass was placed thereon, and the condition of the coating film was visually observed, thereby evaluating the water resistance of the coating film in accordance with the following standard.

(Evaluation Standard)
"A": Not changed;
"B": Change such as whitening is observed on the appearance, but the film is recovered to the condition before the water is dropped after drying; and
"C": Change such as whitening is observed on the appearance, and the film is not recovered to the condition before the water is dropped even after drying.

(4) Adhesion Performance Test:
(4-1) Adhesion Property:

Two grams of a modified polyisocyanate (composition) and 20 g of a main material (II) for evaluation shown below were stirred and mixed for 30 minutes at 2,000 rpm while keeping a liquid temperature at 40° C., and the resultant mixture was left at rest for 6 hours at 40° C., thereby preparing an adhesive composition.

After 2 natural rubber plates subjected to a surface treatment with trichloroisocyanuric acid were laminated with the resultant adhesive composition and contact-bonded for 24 hours at 5 MPa under temperature conditions of 25° C., the adhesive joint was separated by means of a tensile tester. The separated surfaces were visually observed, thereby ranking the adhesive composition as "A" where rubber failure is observed or "C" where ply separation between rubber-adhesive is observed.

Main Material (II) for Evaluation:
An aqueous polyurethane resin (product of NIPPON POLYURETHANE INDUSTRY CO., LTD.) for test: solid content=50%, viscosity (at 25° C.)=250 mPa·s, polyester base.

(4-2) Water-resistant Adhesion Property:

Two natural rubber plates subjected to a surface treatment were laminated with the resultant adhesive composition in the same manner as in (4-1) and contact-bonded for 24 hours at 5 MPa under temperature conditions of 25° C. After this laminate was aged for 3 days at room temperature, immersed for 24 hours in water at 25° C. and then dried for 12 hours at room temperature, the adhesive joint was separated by means of a tensile tester. The separated surfaces were visually observed, thereby ranking the adhesive composition as "A" where rubber failure is observed or "C" where ply separation between rubber-adhesive is observed.

TABLE 1

|  |  | Example | | | | | | Comparative Example | |
|---|---|---|---|---|---|---|---|---|---|
|  |  | 1 | 2 | 3 | 4 | 5 | 6 | 1 | 2 |
| Polyisocyanate 1 | | — | 81 | — | — | — | — | 86 | — |
| Polyisocyanate 2 | | 81 | — | — | 78 | 82 | — | — | 82 |
| Polyisocyanate 3 | | — | — | 81 | — | — | 81 | — | — |
| Modifying agent A | | 13 | 10 | 13 | 10 | 13 | 13 | 14 | 11 |
| Modifying agent B | | 5 | 7 | 5 | 7 | 5 | 5 | — | 5 |
| Modifying agent C | | 1 | 2 | 1 | 5 | 0.5 | 1 | — | — |
| Modifying agent D (comparative) | | — | — | — | — | — | — | — | 2 |
| Anionic surfactant | | — | — | — | — | — | 0.15 | — | — |
| Concentration of sodium | mg/g | 0.41 | 0.82 | 0.41 | 2.05 | 0.20 | 0.41 | 0 | 0 |
| sulfonate | μmol/g | 4.0 | 8.0 | 4.0 | 19.9 | 2.0 | 4.0 | 0 | 0 |
| NCO content | | 17.1 | 15.6 | 13.7 | 16.2 | 17.3 | 13.7 | 16.8 | 17.4 |
| Viscosity (at 25° C.) [mPa · s] | | 1300 | 3000 | 2600 | 1800 | 1200 | 2700 | 3000 | 1170 |
| Number average molecular weight | | 712 | 860 | 1380 | 778 | 704 | 1390 | 802 | 700 |
| Average number of functional groups | | 2.9 | 3.2 | 4.5 | 3.0 | 2.9 | 4.5 | 3.2 | 2.9 |
| Dispersion stability (at 25° C.) | | A | A | A | A | A | A | A | A |
| Foaming time (at 25° C.) | | 7.5 | 5.5 | 6.0 | 7.0 | 7.5 | 11.5 | 4.0 | 5.5 |
| Initial dispersibility (at 40° C.) | | A | A | A | A | B | A | C | B |
| Dispersion stability (at 40° C.) | | A | A | A | A | B | A | C | C |
| Foaming time (at 40° C.) | | 5.0 | 4.0 | 3.5 | 4.5 | 4.5 | 6.0 | 2.0 | 3.5 |
| Coating film performance | Temperature dependence of transparency | 6.2 | 2.0 | 5.5 | −1.0 | 8.0 | −2.0 | 15.1 | 16.5 |
|  | Water resistance | A | A | A | B | A | A | A | A |
| Adhesion performance | Adhesion property | A | A | A | A | A | A | C | C |
|  | Water-resistant adhesion property | A | A | A | A | A | A | C | C |

|  |  | Comparative Example | | | | |
|---|---|---|---|---|---|---|
|  |  | 3 | 4 | 5 | 6 | 7 |
| Polyisocyanate 1 | | 83 | 73 | 82 | — | — |
| Polyisocyanate 2 | | — | — | — | 73 | 80 |
| Polyisocyanate 3 | | — | — | — | — | — |
| Modifying agent A | | 12 | 14 | 11 | 10 | 13 |
| Modifying agent B | | 5 | — | — | 7 | 7 |
| Modifying agent C | | — | — | 7 | 10 | 0.25 |
| Modifying agent D (comparative) | | — | 13 | — | — | — |
| Anionic surfactant | | — | — | — | — | — |
| Concentration of sodium | mg/g | 0 | 0 | 2.87 | 4.10 | 0.10 |
| sulfonate | μmol/g | 0 | 0 | 27.9 | 39.8 | 0.99 |
| NCO content | | 16.1 | 12.5 | 15.6 | 14.4 | 16.8 |
| Viscosity (at 25° C.) [mPa · s] | | 3400 | 2800 | 4000 | 4850 | 1150 |
| Number average molecular weight | | 836 | 940 | 942 | 904 | 725 |
| Average number of functional groups | | 3.2 | 2.8 | 3.5 | 3.1 | 2.9 |
| Dispersion stability (at 25° C.) | | A | A | A | A | A |
| Foaming time (at 25° C.) | | 5.0 | 6.0 | 4.5 | 6.0 | 5.0 |
| Initial dispersibility (at 40° C.) | | C | B | A | A | B |
| Dispersion stability (at 40° C.) | | C | C | A | A | C |
| Foaming time (at 40° C.) | | 3.5 | 4.5 | 2.5 | 4.5 | 3.5 |
| Coating film performance | Temperature dependence of transparency | 15.5 | 10.8 | −2.5 | −5.0 | 12.0 |
|  | Water resistance | A | A | C | C | A |
| Adhesion performance | Adhesion property | C | C | A | A | C |
|  | Water-resistant adhesion property | C | C | C | C | C |

INDUSTRIAL APPLICABILITY

The aqueous modified polyisocyanates according to the present invention can be suitably used as hardeners for various kinds of aqueous coatings and aqueous adhesives.

The invention claimed is:

1. An aqueous modified polyisocyanate for dispersion in an aqueous medium, the aqueous modified polyisocyanate being obtained by reacting an HDI compound with:

(A) a modifying agent comprising a methoxy polyoxyalkylene glycol comprising an ethylene oxide unit having 70 mol% or higher of alkylene oxide units, (B) a modifying agent which is polyoxypropylene mono-2-ethylhexyl ether, and (C) a modifying agent comprising an ester compound having at least one hydroxyl group and an alkali metal salt of sulfonic acid, wherein the concentration of the alkali metal salt of sulfonic acid is 1.5 to 25 μmol/g.

2. The aqueous modified polyisocyanate according to claim 1, wherein the HDI compound is an isocyanurate group-containing polyisocyanate.

3. The aqueous modified polyisocyanate according to claim 2, wherein in the isocyanurate group-containing polyisocyanate, the proportion of a trimer as determined by differential refractive index detection of GPC is 60% by area or higher, and the average number of functional groups as determined on the basis of GPC analysis is 2.4 to 5.0.

4. The aqueous modified polyisocyanate according to claim 1, wherein the HDI compound is an allophanate group-containing polyisocyanate.

5. The aqueous modified polyisocyanate according to any one of claims 1 to 4, wherein the viscosity at 25° C. of the HDI compound is 2,500 mPa·s or lower.

6. The aqueous modified polyisocyanate according to any one of claims 1 to 4, wherein the viscosity at 25° C. of the HDI compound is 2,000 mPa·s or lower.

7. The aqueous modified polyisocyanate according to claim 1, wherein the modifying agent (A) is methoxy polyoxyethylene glycol.

8. The aqueous modified polyisocyanate according to claim 1, wherein the modifying agent (C) is a polyester polyol containing sodium sulfonate.

9. The aqueous modified polyisocyanate according to claim 1, which is obtained by reacting 67 to 92.5 % by mass of the HDI compound with 5.0 to 20% by mass of the modifying agent (A), 2.0 to 10% by mass of the modifying agent (B) and 0.5 to 7.0% by mass of the modifying agent (C).

10. The aqueous modified polyisocyanate according to claim 1, wherein the concentration of the alkali metal salt of sulfonic acid is 2.0 to 20 µmol/g.

11. An aqueous polyisocyanate composition comprising the aqueous modified polyisocyanate according to claim 1, and an anionic surfactant.

12. A non-yellowing coating composition comprising:
a main material containing a water-soluble or water-dispersible polymer, and
a hardener comprising the aqueous modified polyisocyanate according to claim 1.

13. An adhesive composition comprising:
a main material containing a water-soluble or water-dispersible polymer, and
a hardener comprising the aqueous modified polyisocyanate according to claim 1.

14. The aqueous modified polyisocyanate according to claim 9, wherein the modifying agent (A) is methoxy polyoxyethylene glycol.

15. The aqueous modified polyisocyanate according to claim 9, wherein the modifying agent (C) is a polyester polyol containing sodium sulfonate.

16. The aqueous modified polyisocyanate according to claim 10, wherein the modifying agent (A) is methoxy polyoxyethylene glycol.

17. The aqueous modified polyisocyanate according to claim 10, wherein the modifying agent (C) is a polyester polyol containing sodium sulfonate.

* * * * *